UNITED STATES PATENT OFFICE 2,367,810

POLYMERIZATION OF STYRENE AND ITS DERIVATIVES

Victor H. Turkington, Caldwell, and Leo R. Whiting, Woodbridge, N. J., assignors to Bakelite Corporation, New York, N. Y., a corporation of New Jersey No Drawing. Application June 28, 1941,
Serial No. 400,250

10 Claims. (Cl. 260—91)

This invention relates to the polymerization of styrene and its polymerizable derivatives in the presence of catalytic agents which promote polymerization.

While it is known that the halogen compounds of boron, and particularly boron trifluoride are active polymerization catalysts for styrene, the employment of these catalysts to polymerize commercial size batches of monomeric styrene has been difficult because of the violence of the reaction produced by these catalysts. It has been found necessary, for instance, to cool the monomeric substance which is to be polymerized to temperatures below 0° C., prior to the introduction of these catalysts; and even with this precaution, the exothermic reaction which results immediately upon the introduction of the catalyst, generates so much heat, that satisfactory heat dissipation cannot be obtained in commercial size equipment.

According to the present invention polymerization catalysts are provided whereby light colored to water white polymeric products are obtained under controlled conditions of polymerization of styrene and its derivatives. In addition polymers are produced which are more stable to the effect of elevated temperatures than those produced from the same monomeric compounds by polymerization under heat and without the presence of these catalysts.

The invention has for its basis the discovery of catalyst compositions which effectively promote the polymerization of unsaturated compounds typified by monomeric styrene and its polymerizable derivatives. Styrene derivatives which can be so treated include o-methyl styrene, meta-methyl styrene and para-methyl styrene as examples of derivatives with an alkyl group substituted in the benzene ring, alpha methyl styrene and beta-methyl styrene as examples of styrene derivatives with an alkyl group in the side chain, para-chlorostyrene as typical of the halogen substituted styrenes, styrenes having a phenyl group on the side chain, hydroxy and methoxy styrenes, etc.

The catalyst compositions for polymerizing the styrene compounds as hereinbefore mentioned according to this invention comprise two components, either one or both being an acid. One component of the composition is either oxalic acid

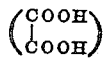

or a compound of oxalic acid, which can be expressed by the formula: ROOC—COOR' wherein R and R' are hydrogen, or a univalent hydrocarbon radical. In addition other compounds which decompose upon heating or under the reacting conditions to engender oxalic acid may be used. The other component is a compound characterized by the presence of an oxide of boron either as such or as a radical, such as the acids of boron exemplified by $H_3BO_3$ and $HBO_2$, oxides of boron as $B_2O_3$, metallic borates such as $MnH_4(BO_3)_2$, organic borates having an alkyl, or aromatic group such as triamyl borate and triphenyl borate, alkali borates such as $Na_2B_4O_7$, and $(NH_4)_2B_4O_7$; these boron compounds are similar, in that all contain one or more boron atoms, each boron atom having at least one of its valences satisfied by linkage with an oxygen atom, and for the purposes of this invention are identified herein as oxy-compounds of boron.

The presence of both components is found necessary to obtain the desired rapid catalytic action in the polymerization of styrene and its polymerizable derivatives, since with only one of the components present, catalytic activity has proven to be negligible. Only a small amount of any one of these catalyst compositions, however, is required to promote the polymerization of monomeric styrene, etc.; for example less than 0.01% of a catalyst composition composed of equal parts boric acid ($H_3BO_3$) and oxalic acid was found sufficient to polymerize monomeric styrene to a polymer containing less than 10% monomer. The proportion of boron compound to oxalic acid in the composite catalyst is not critical, for the catalytic action has been found to take place when only the slightest trace (0.001%) of a boron compound was present in a sample of monomeric styrene containing a relatively very large proportion (4%) of oxalic acid; likewise styrene containing only a trace of oxalic acid (0.05%) and 1% boric acid polymerized satisfactorily. There is no maximum limit on the amount of these composite catalysts which can be added to a polymerizable monomer; but since only a small amount of the catalyst is sufficient to cause a rapid polymerization, it is an economic waste to employ larger amounts. An excess of oxalic acid may be desirable, however, when high temperatures are employed, because oxalic acid is easily volatilized or decomposed at temperatures above 150° C. But the presence of water during the polymerization reaction is to be avoided, since water diminishes the effectiveness of these catalysts.

The catalyst compositions may be added in various ways to the monomeric styrene or other compound. For instance the composition of powdered boric acid ($H_3BO_3$) and oxalic acid may be first prepared and then introduced into the monomeric compound which is subjected to stirring to maintain an adequate distribution of the catalyst throughout the mass of monomer; the monomer is then carefully heated until an exothermic reaction occurs whereupon practically all the monomer is converted to a polymer. Another method of using these catalyst compositions is to add one of the components of the catalyst composition to the monomer, and since there is none or only a negligible catalytic effect with one of the catalyst components present, the monomer containing the one catalyst component may be safely stored; when a polymerization reaction is desired, the other component of the catalyst mixture is added; such a procedure may be used to advantage where it is desirable to polymerize a monomer in situ, as in gasket constructions, coatings, cast moldings, and joint compounds.

A preferred method, however, is that of first polymerizing a small amount of a monomer, which may be styrene, by cautiously heating the monomer in the presence of a composite catalyst of say about 0.1% of equal parts oxalic acid and triamyl borate. At a temperature of about 140° C. a vigorous exothermic reaction takes place with a practically instantaneous formation of a liquid polystyrene. This polymerized styrene is then used as a reaction medium for polymerizing additional quantities of monomeric styrene. A catalyst composition containing 0.03% of triamyl borate and 0.10% of oxalic acid is added at room temperature to the remaining monomeric styrene in a separate vessel, at which temperature the catalyst does not have an appreciable effect. The reaction medium of the liquid polystyrene is heated in a still equipped with a reflux condenser and mechanical agitation to a temperature of about 200° C. and held there while the monomeric compound with its catalyst content is slowly fed from the other vessel into the heated polymer reaction medium. Little or no additional heat need be applied to the reaction vessel to maintain the temperature at 200° C., since sufficient heat is given off by the exothermic reaction. But during the entire period of introducing the monomer into the reaction vessel it is usually essential that the catalyst composition be kept suspended by agitation throughout the entire mass of monomer because of catalyst components which are not soluble in the monomers at low temperature; for instance, triamyl borate is soluble in styrene but oxalic acid must be kept in suspension by adequate stirring. The resultant polymer that is formed is continuously drawn out of the reaction vessel. A polymer of styrene formed under these reacting conditions has a viscosity ranging between 2000 and 6000 kinematic viscosity at 25° C.

The catalyst compositions are preferably added to the hot reaction medium of liquid polystyrene, when catalyst components, as oxalic acid, or certain compounds of it, are present which are apt to be volatilized off at temperatures over 160° C. The boron component, being generally more stable at elevated temperatures, can be placed in the hot reaction medium, and the other component in the monomer; satisfactory polymerization takes place, for the catalytic effect occurs so rapidly that complete polymerization of the monomer is obtained before the oxalic acid is decomposed or sublimed or distilled out of the reaction medium.

A continuous process for polymerizing styrene and its polymerizable homologs by means of these catalyst compositions is that of slowly pumping the monomer containing the composite catalyst of the boron compound and oxalic acid (or one of its compounds) through a long spiral of metal tubing immersed in a thermostatically controlled liquid heating bath of sufficient heating and cooling capacity to maintain a constant temperature of the reaction tube; the polymer is continuously drawn off and can be subsequently purified or fractionally distilled if desirable. Such a process is capable of producing polymers containing less than 2% unchanged monomer.

The presence of inhibitors such as sulphur, hydroquinone, resorcinol or catechol in monomeric styrene or its polymerizable homologs does not harm the polymerization property of the catalyst compositions, and therefore it is not necessary to remove the inhibitors prior to the polymerization reaction. In polymerizing styrene with the catalyst compositions it has been found that the temperature at which the polymerization reaction is conducted determines the kind of polymer which is produced. When the reaction is conducted at low temperatures, that is, at 140° C. or lower, polymers which are solid at room temperatures are produced; above 140° C. and up to and above 225° C., polymers ranging from very viscous (about 200,000 kinematic viscosity at 25° C.) to thin liquid polymers with a viscosity of about 1500 kinematic viscosity at 25° C. can be obtained. Similarly other polymerizable derivatives of styrene by control of the temperature of the reaction can be formed into polymers which range from liquids to solids at room temperature.

The polymers produced by means of these catalyst compositions are light resistant and quite heat stable, showing no evidence of depolymerizing when subjected to temperatures over 300° C.; for this reason among others they are useful as components of lacquers, varnishes, adhesives, films, and molding compositions. They are compatible with ethyl cellulose, ester gums, natural and synthetic resins, and with aliphatic and aromatic plasticizers and solvents. These polymers are also soluble in drying oils such as tung oil, oiticica oil, linseed oil, dehydrated castor oils. Where it is desired to heat-body a drying oil in the presence of the polymer at temperatures, which may reach 290° C., the lower viscosity polymers are preferred since they give the clearest and brightest solutions with the drying oils; styrene polymers having a viscosity of 3000 K. V. or less at 25° C. are the most easily dissolved in drying oils and also in petroleum oils.

The following examples illustrate the methods of polymerization and the polymers produced by the employment of the catalyst compositions of this invention, but they are not to be construed as limiting the same.

*Example 1.*—100 parts of monomeric styrene containing 1.0 part of a finely ground composite catalyst of equal parts by weight of boric acid ($H_3BO_3$) and oxalic acid, were slowly heated with continuous mechanical agitation to keep the catalyst components well dispersed in the monomeric styrene. At a temperature of 138° C. an exothermic reaction began, and the temperature of the reacting mass rose to 204° C. in less than a minute with a conversion of over 95% of the monomeric styrene to a polymer which was clear and viscous at room temperature, and stable to the effect of temperatures over 200° C.

*Example 2.*—100 parts of monomeric styrene, containing 5 parts of hydroquinone which is an inhibitor for styrene, had added thereto a composite catalyst of 0.1 part of boric acid ($H_3BO_3$) and 0.1 part of oxalic acid, and the mass was heated with continuous mechanical agitation until a mild exothermic reaction began. Upon the subsidence of this exothermic reaction external heat was applied to raise the temperature of the mass to 200° C. to volatilize off the oxalic acid and about 5% of unreacted monomer. A clear polymer, viscous at room temperature, heat stable at temperatures above 200° C. was obtained by the foregoing process.

*Example 3.*—100 grams of monomeric styrene, with a catalyst made up of ½ cc. of triamyl borate and 0.1 gram of oxalic acid, were heated with stirring under reflux to 138° C., at which temperature an exothermic reaction began with a rise in temperature to over 200° C. This treatment resulted in a viscous polymer at room temperature and it was heat stable at temperatures over 200° C.

*Example 4.*—100 parts of α-methyl styrene, having as a catalyst 0.1 part of oxalic acid and 0.5 part of triamyl borate, were heated to 127° C. when an exothermic reaction began which increased the temperature of the reacting mass to 182° C. After the exothermic reaction subsided, external heat was applied to raise the temperature to 205° C. This treatment resulted in a clear liquid polymer that was heat stable at temperatures over 200° C.

*Example 5.*—150 grams of monomeric monochlorstyrene, the catalyst being 0.32 gram of oxalic acid and 0.2 cc. of triamyl borate, were well agitated and heated in the open until an exothermic reaction began at about 110° C. resulting in the formation of a clear viscous but slightly yellow polymer at room temperature that was also stable at temperatures above 200° C.

*Example 6.*—100 grams of monomeric alpha-methyl-para-methyl styrene with a composite catalyst of 0.15 gram of boric acid and 0.5 gram of oxalic acid, were heated with continuous mechanical agitation. An exothermic reaction began when the temperature reached 135° C. and without further application of external heat the temperature of the reacting mass rose to 232° C., resulting in a water white polymer viscous at room temperature and heat stable at 200° C.

*Example 7.*—100 grams of monomeric styrene, containing as the catalyst 1.0 gram boric acid and 0.5 gram diethyl oxalate, were heated to 140° C. and held there for 1 minute. A vigorous exothermic reaction occurred and the temperature rose to 180° C. resulting in the formation of clear viscous polymer having a viscosity of approximately 6000 K. V. at room temperature. This polymer was heat stable and resistant to oxidation.

*Example 8.*—In 100 grams of monomeric styrene were included as a catalyst 1 gram boron oxide ($B_2O_3$) and 1 gram of oxalic acid, and the mass was heated with vigorous stirring to 140° C. Within less than a minute after coming to this temperature an exothermic reaction occurred with the temperature rising to about 185° C. A clear light colored polymer, viscous at room temperature was the product produced by this treatment.

*Example 9.*—100 grams of monomeric styrene had added as a catalyst 0.5 gram manganese borate and 0.5 gram oxalic acid and were heated with vigorous stirring to 140° C. at which temperature an exothermic reaction began, causing the temperature to rise to 180° C. A clear light colored polymer, viscous at room temperature, was produced by this treatment.

*Example 10.*—10 pounds of polystyrene produced as in Example 3 and containing 1 cc. of triamyl borate were heated in a still to 210° C. and held there to serve as a reaction medium for polymerizing monomeric styrene. In a separate tank equipped with mechanical agitating means, 40 pounds of monomeric styrene were thoroughly mixed with a catalyst of 60 grams of oxalic acid and 6 grams of triamyl borate. Then while the reaction medium was maintained at 210° C., a proportioning pump fed the monomeric styrene containing the catalyst into the still at such a rate that the temperature of the reaction medium remained between 210° and 220° C. and only a small amount of unreacted monomer (less than 2%) distilled off during the entire period of feeding the whole charge of the monomer into the reaction medium. The polystyrene was heated to 200° C. under 70 cm. of vacuum to remove any unreacted monomer remaining. The final polymer had a viscosity of about 3000 K. V. at 25° C.

A 400 gram sample of the liquid polystyrene so produced was fractionally distilled under 4 mm. vacuum and showed the following properties:

| Fraction No. | Boiling range | Amount | Refractive index at 25° C. | Molecular weight (approx.) | Specific gravity 25°/25 | Viscosity at 25° C. (approx.) |
|---|---|---|---|---|---|---|
| | ° C. | Grams | | | | |
| 1 | 30–160 | 27.7 | 1.5866 | 214 | 1.004 | 40 |
| 2 | 160–180 | 46.8 | 1.5885 | 218 | 1.002 | 45 |
| 3 | 180–230 | 44.6 | 1.5910 | 222 | 1.003 | 51 |
| 4 | 230–240 | 75.4 | 1.5990 | 338 | 1.041 | 40,000 |
| Residue | | 205 | 1.6075 | 514 | 1.060 | 150,000 |
| Original polymer | | | 1.5999 | 358 | 1.037 | 2,290 |

The presence of monomeric styrene could not be detected in any of the distilled fractions, indicating that the original polymer did not depolymerize under the high temperature conditions of the distillation.

What is claimed is:

1. Method of polymerizing monomeric compounds containing a styrene nucleus having a single olefinic hydrocarbon side chain which comprises heating the monomer in the presence of a two component catalyst composition which comprises as one component an oxy-compound of boron wherein each boron atom has at least one of its valences satisfied by linkage with an oxygen atom, and as the second component a compound of the formula R′—OOC—COO—R wherein R′ and R represent each a member selected from the group consisting of hydrogen and univalent hydrocarbon radicals.

2. Method of polymerizing monomeric compounds containing a styrene nucleus having a single olefinic hydrocarbon side chain which comprises heating the monomer in the presence of a two component catalyst composition comprising as one component an oxy-compound of boron wherein each boron atom has at least one of its valences satisfied by linkage with an oxygen atom, and as the second component oxalic acid.

3. Method of polymerizing monomeric compounds containing a styrene nucleus having a single olefinic hydrocarbon side chain which comprises heating the monomer in the presence of a two component catalyst composition comprising as one component a boric acid and as the second component oxalic acid.

4. Method of polymerizing monomeric compounds containing a styrene nucleus having a single olefinic hydrocarbon side chain which comprises introducing the monomeric compound into its heated liquid polymer in the presence of a two component catalyst composition comprising as one component an oxy-compound of boron wherein each boron atom has at least one of its valences satisfied by linkage with an oxygen atom, and as the second component a compound of the formula R'—OOC—COO—R wherein R' and R represent each a member selected from the group consisting of hydrogen and univalent hydrocarbon radicals.

5. Method of polymerizing monomeric compounds containing a styrene nucleus having a single olefinic hydrocarbon side chain which comprises introducing the monomeric compound into its heated liquid polymer in the presence of a two component catalyst composition comprising as one component an oxy-compound of boron wherein each boron atom has at least one of its valences satisfied by linkage with an oxygen atom, and as the second component oxalic acid.

6. Method of polymerizing monomeric compounds containing a styrene nucleus having a single olefinic hydrocarbon side chain which comprises introducing the monomeric compound into its heated liquid polymer in the presence of a two component catalyst composition comprising as one component a boric acid and as the second component oxalic acid.

7. Method of polymerizing styrene monomer which comprises heating the monomer in the presence of a two component catalyst composition comprising as one component an oxy-compound of boron wherein each boron atom has at least one of its valences satisfied by linkage with an oxygen atom, and as the second component a compound of the formula R'—OOC—COO—R wherein R' and R represent each a member selected from the group consisting of hydrogen and univalent hydrocarbon radicals.

8. Method of polymerizing styrene monomer which comprises heating the monomer in the presence of a two component catalyst composition comprising as one component an oxy-compound of boron wherein each boron atom has at least one of its valences satisfied by linkage with an oxygen atom, and as the second component oxalic acid.

9. Method of polymerizing styrene monomer which comprises heating the monomer in the presence of a two component catalyst composition comprising as one component oxalic acid, and as the second component an alkyl borate soluble in the monomer.

10. Method of polymerizing styrene monomer which comprises heating the monomer in the presence of a two component catalyst composition comprising as one component a boric acid and as the second component oxalic acid.

VICTOR H. TURKINGTON
LEO R. WHITING.